Figure 1:
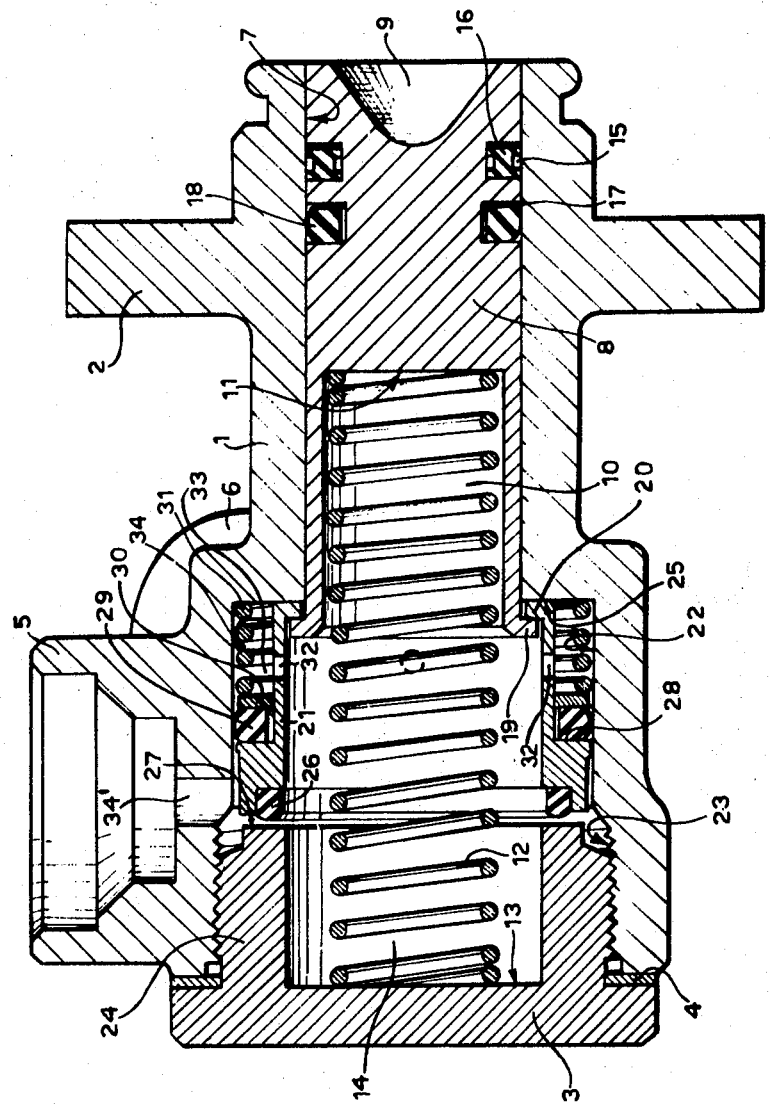

United States Patent

[11] 3,633,367

[72] Inventor Philip S. Baldwin
 Florence, Italy
[21] Appl. No. 41,033
[22] Filed May 27, 1970
[45] Patented Jan. 11, 1972
[73] Assignee FIAT Societa per Azioni
 Turin, Italy
[32] Priority May 30, 1969
[33] Italy
[31] 52054 A/69

[54] MASTER CYLINDER ASSEMBLY FOR VEHICLE HYDRAULIC BRAKE SYSTEMS
 14 Claims, 2 Drawing Figs.
[52] U.S. Cl.................................................... 60/54.6 R,
 60/54.6 E
[51] Int. Cl..................................................... F15b 7/00
[50] Field of Search........................................... 60/54.6,
 54.5 A, 54.6 A, 54.5 E, 54.6 E

[56] References Cited
 UNITED STATES PATENTS
3,487,641 1/1970 Hackett........................ 60/54.6
3,247,670 4/1966 Bauman........................ 60/54.6
3,345,818 10/1967 Milster......................... 60/54.6 E Primary Examiner—Martin P. Schwadron
Assistant Examiner—A. M. Zupcic
Attorney—Sughrue, Rothwell, Mion, Zinn & Macpeak ABSTRACT: A master cylinder assembly for vehicular hydraulic brake systems has a cylinder closed at one end, with a piston sliding in the cylinder and defining therein a compression chamber which communicates through first and second ports with a point of use and an hydraulic fluid reservoir respectively. A reaction spring urges the piston away from the closed end of the cylinder against a stop and flow of hydraulic fluid through the said second port is controlled by valve means. According to this invention the valve means comprise a tubular member, slidable, with axial and radial play, in the compression chamber, a frontal annular packing carried by the tubular member and cooperating with an annular radial seat, and a peripheral annular packing adapted to seal against the said lateral wall of the cylinder bore. The two said ports are always disposed on opposite sides of the peripheral packing and the tubular member is biased towards a position in which the frontal packing is spaced from its seat, permitting open communication between the two ports when the piston is resting against its stop. Means are provided for displacing the tubular member towards the said seat upon the movement of the piston towards the closed end of the cylinder for actuating the brakes.

MASTER CYLINDER ASSEMBLY FOR VEHICLE HYDRAULIC BRAKE SYSTEMS

This invention relates to master cylinder assemblies for use particularly in the hydraulic brake systems of motor vehicles, but also capable of application generally where a mechanism to be operated has to be connected to a source of hydraulic pressure.

Master cylinder assemblies of the aforesaid type are already well known, such cylinder assemblies comprising in general a cylinder having one end open and the other closed, a piston slidingly mounted in the cylinder and defining with the bore of the cylinder and with the closed end of the latter a compression chamber communicating with first and second ports adapted to be connected to a point of use and to an hydraulic fluid reservoir respectively, a reaction spring designed to urge the piston away from the closed end of the cylinder against a stop, and valve means for controlling the flow of hydraulic fluid through the said second port. Such a master cylinder device is referred to herein as being "of the type specified."

An object of the present invention is to provide a master cylinder assembly substantially of the type specified above, the length of which is appreciably less than that of known cylinders of the aforesaid type.

Another object of the invention is to provide a master cylinder assembly in which the idle stroke of the piston at the commencement of braking is small, in which no special means are needed for stopping the piston in its rest position and in which the need for compensation pinholes arranged parallel to the normal passages which connect the compression chamber of the cylinder with the reservoir is avoided.

According to the invention there is provided a master cylinder assembly of the type specified, characterized in that the said valve means comprise a tubular member slidingly mounted, with axial and radial play, in that lateral wall portion of the bore of the cylinder which constitutes the compression chamber, the said tubular member bearing a frontal annular packing adapted to cooperate with an annular seat disposed in a radial plane of the cylinder, and a peripheral annular packing adapted to seal against the said lateral wall portion, the said ports being always disposed on opposite sides of the peripheral packing, means for biassing the said tubular member towards a position in which the respective frontal packing is spaced from the respective seat, leaving open communication between the two ports, when the piston is resting against the said stop, and means adapted to displace the tubular member towards the said seat upon the movement of the piston towards the closed end of the cylinder.

According to one preferred operational embodiment of the invention the said tubular member has a diameter differing from that of the piston, the said biassing means for the tubular member and the piston respectively in such a way that the flange on the piston is disposed between the flange on the tubular member and the closed end of the cylinder, and the distance of the flange on the piston from the closed end of the cylinder when the piston is resting against the said stop is greater than the distance which separates the flange on the tubular member from the sealing surface of the frontal packing.

Figure 2:
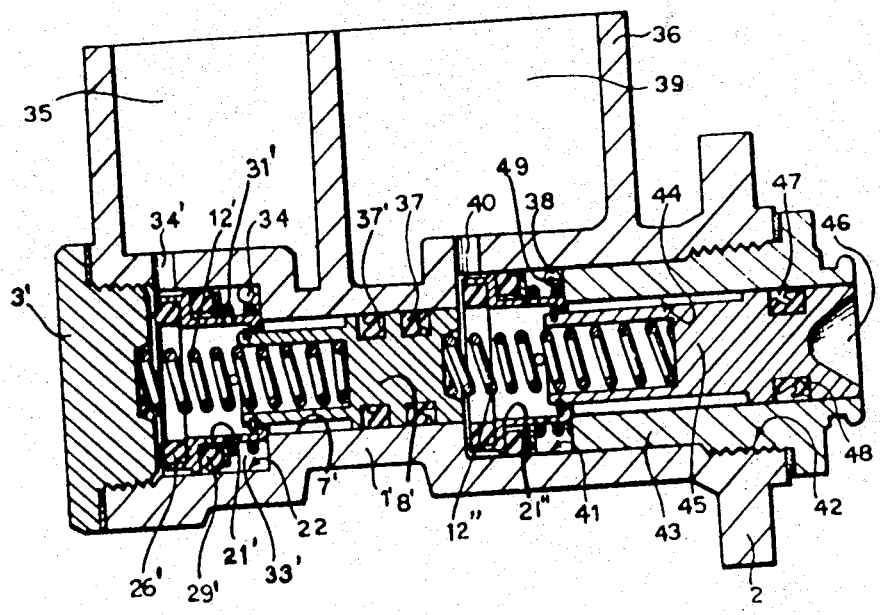

The invention will be further described, by way of nonlimiting example, with reference to the accompanying drawings, in which:

FIG. 1 is an axial section of a master cylinder assembly according to one embodiment of the invention intended for the supply of fluid under pressure to a single point of use, and FIG. 2 is an axial section of a double master cylinder assembly according to another embodiment of the invention, intended for the supply of fluid under pressure to two separate points of use or utilizing circuits.

In both figures of the drawings, component parts corresponding with each other are indicated by the same reference numerals.

The master cylinder assembly shown in FIG. 1 includes a cylinder 1 one end (the right-hand end as shown) of which is open and is formed with an external radial flange 2 for attachment of the cylinder to a load-bearing structure, for example to one part of the body (not shown) of a motor vehicle. The other, left-hand, end (as shown in FIG. 1) of the cylinder 1 is closed by a plug 3 with the interposition of a sealing washer 4. At this end the cylinder 1 also has a lateral connector boss 5 for connection to a pipe (not shown) leading to a reservoir (not shown) for the hydraulic fluid. A lateral boss 6 is also provided, at right angles to the boss 5, for connection to a pressure-transmitting pipe leading to a point of use or utilizing circuit (not shown) such as one or more slave cylinders arranged to actuate vehicle brakes.

The bore of the cylinder has a first section 7, at the right-hand end, of smaller diameter in which a piston 8 is mounted for sliding movement. This piston 8 has at its end which faces the open end of the cylinder 1 a rounded conical recess 9 for the reception of a cooperating end of a pushrod (not shown) forming part of a mechanical linkage for controlling the movement of the piston 8. At its other end the piston 8 has a cylindrical blind bore 10 in which one end of a reaction spring 12 is located, the spring 12 bearing against the bottom 11 of the bore 10. The other end of the spring 12 bears against the bottom 13 of a cylindrical blind bore 14 made in the plug 3.

In proximity to the recess 9 the piston 8 is provided on its external cylindrical surface with an annular peripheral groove 15 in which is housed, with axial play, a resilient sealing ring 16 having in cross section the shape of an H. Next to the annular groove 15 there is provided another peripheral annular groove 17 which is arranged on that side of the groove 15 which is remote from the recess 9. In the groove 17 there is housed, with both axial and radial play, a resilient sealing ring 18. The ring 18 has in cross section a substantially rectangular shape, but with a slightly outwardly curved profile on its surface which faces and seals against the internal cylindrical wall of the bore section 7. The sealing ring 18 ensures sealing of the piston in the bore section 7 during compression strokes of the piston 8 against the action of the spring 12 and also during strokes in the opposite direction, thereby guaranteeing sealing not only against leaks of the liquid from the inside of the cylinder 1 but also against entry of air into the cylinder. The function of the H-section sealing ring 16 is on the other hand that of a scraper ring.

The inner end of the piston 8 which faces the plug 3 has an external radial flange 19 normally supported against an annular internal flange 20 formed at one end of a tubular member 21. The internal diameter of the member 21 is substantially greater than the external diameter of the piston 8. The tubular member 21 is slidingly mounted in a section 22 of the bore of the cylinder 1 of greater diameter than the bore section 7 in which the piston 8 slides.

The bore section 22 communicates with a terminal bore section 23, at the left-hand end of the cylinder bore, the diameter of which is slightly larger than that of the bore section 22. The bore section 23 is threaded to receive an externally threaded tubular part 24 of the plug 3.

The radial flange 20 of the tubular member 21 rests normally against a radial annular shoulder 25 defined between the bore sections 7 and 22 of the cylinder 1, being held against the shoulder 25 by the radial flange 19 of the piston 8, which is in turn urged towards the shoulder 25 by the action of the spring 12.

The end face of the tubular member 21 opposite the piston 8 is formed with an annular groove which houses a frontal sealing packing 26 adapted to cooperate with an annular radially extending seat 27 formed upon the inner (right-hand) end of the tubular part 24 of the plug 3. The length of the tubular member 21 is such that, when its radial flange 20 is resting against the shoulder 25, the packing 26 is spaced from the annular seat 27.

On the external cylindrical surface of the tubular member 21 there is provided an annular radial shoulder 28 against which a peripheral sealing packing 29 rests. The packing 29 has in cross section a substantially rectangular shape with an outwardly curved profile on its surface which is in contact with the internal wall of the bore section 22. The packing 29 is compressed axially, with the interposition of a washer 30, by a light spring 31 interposed between the said washer 30 and the previously mentioned shoulder 25 of the cylinder bore.

The tubular member 21 has a number of radial vents 32 which connect the interior of the member 21 with an annular compression chamber 33 formed between the external surface of the tubular member 21 and the bore section 22 between the packing 29 and the shoulder 25. The chamber 33 communicates, by means of a port 34, with the interior of the lateral boss 6 which is adapted to be connected to the point of use or utilizing circuit (not shown).

A further annular space is defined between the external surface of the tubular member 21 and the bore section 22, on the other side of the packing 29 from the chamber 33: this space communicates, by means of a port 34' with the interior of the boss 5 adapted to be connected to the fluid reservoir (not shown).

The manner of operation of the master cylinder of FIG. 1 will now be described.

Upon operation of a brake pedal (not shown) the piston 8 is displaced in the direction of the plug 3 against the action of the spring 12. The radial flange 19 of the piston 8 moves towards the left and permits movement of the tubular member 21 in the same direction, under the action of the spring 31. The tubular member 21 ceases to move as soon as the frontal sealing packing 26 comes to rest against the radial seat 27. Thereafter further movement of the piston 8 to the left will reduce the volume of, and therefore increase the hydraulic pressure in, the chamber formed by the blind bore 10, the interior of the tubular member 21 and by the blind bore 14 of the plug 3, and also including the annular compression chamber 33 which communicates with the interior of the member 21 through the radial vents 32. The increase of hydraulic pressure in the chamber 33 results in an axial compression of the packing 29 and its fluidtight sealing against the wall of the bore section 22, while at the same time compressing the packing 26 against the radial seat 27. This excludes any possibility of transfer of hydraulic fluid under pressure through the port 34' into the reservoir, which therefore remains cut off from the compression chamber during this phase of operation of the master cylinder, hydraulic fluid under pressure being supplied to the utilizing circuit through the port 34.

Upon release of the thrust exerted upon the piston 8, the reaction spring 12 will return the piston 8 to the position shown in the drawing when the flange 19 holds the flange 20 against the shoulder 25. This reestablishes communication between the compression chamber 33 and the reservoir, through the port 34, vents 32, the interior of the tubular member 21, the clearance between the frontal packing 26 and the seat 27, and the port 34'.

The master cylinder assembly illustrated in FIG. 2 is adapted to supply two separate utilizing circuits (not shown) from two respective compartments 35, 39 formed in a reservoir 36 for the hydraulic fluid which is made in one single piece with the casing of the cylinder 1'.

The cylinder 1' has bore sections 7' and 22' which house a piston 8' and tubular member 21', the construction and arrangement of which differ from that shown in FIG. 1 only in the use of sealing rings 37, 37' of the annular cap type in place of the sealing rings 16 and 18 of FIG. 1. This part of the cylinder 1' is arranged to supply a first utilizing circuit, through a port 34, from the reservoir compartment 35.

The master cylinder 1' has a second part adapted to supply the second utilizing circuit, via a port 38, from the reservoir compartment 39. The latter communicates through a port 40 in the wall of the cylinder with a bore section 41 of the cylinder, the diameter of which is equal to that of the bore section 22'. This bore section 41 has a threaded end 42 into which is screwed a ferrule 43 having a through bore 44. A second piston 45 is slidingly mounted in the bore 44. The outer end of the piston 45 has a conical recess 46 which forms a seat for a pushrod (not shown) for movement of the piston 45 by means of the brake-actuating linkage. The piston 45 has a single peripheral annular groove 47 within which sealing ring 48, also of the annular cap type, is located, the groove 47 being disposed close to the recess 46.

Those parts of the master cylinder 1' which in construction and operation correspond to those of the master cylinder 1 of FIG. 1, are marked with the same reference numerals as used in FIG. 1, with the addition of a single prime (').

It will be observed that in the case of the second piston 45 the function of the shoulder 25 of the master cylinder of FIG. 1 is performed by a frontal annular face 49 of the ferrule 43.

The end surfaces of the pistons 8' and 45 which face the plug 3' have diameters which are less than the internal diameters of the respective sliding tubular members 21', 21" cooperating therewith, and the external radial flanges at the said ends of the pistons are formed by respective spring washers housed in annular grooves made in the external surfaces of the respective pistons 8' and 45, in proximity to the said ends thereof.

The master cylinder assembly illustrated in FIG. 2 enables two utilizing circuits, separate from each other, to be supplied with hydraulic fluid. An important advantage of this cylinder as compared with those already known is, however, the smaller neutral stroke of the pistons and a smaller overall length.

I claim:

1. Master cylinder assembly, particularly but not exclusively for hydraulic brake systems for vehicles, comprising:
   i. a cylinder having one end open and the other end closed;
   ii. a piston slidingly mounted in the cylinder and defining with a portion of the bore of the cylinder and with the closed end of the latter a compression chamber;
   iii. first and second ports communicating with the compression chamber and adapted to be connected to a point of use and to an hydraulic fluid reservoir respectively;
   iv. a stop;
   v. a reaction spring urging the piston away from the closed end of the cylinder against the stop;
   vi. valve means controlling the flow of hydraulic fluid through the said second port, and further comprising the improvement which consists in
   vii. the said valve means comprising a tubular member slidingly mounted, with axial and radial play, in the said portion of the bore of the cylinder which constitutes the compression chamber;
   viii. an annular seat disposed in a radial plane of the cylinder;
   ix. a frontal annular packing adapted to cooperate with the said annular seat;
   x. a peripheral annular packing adapted to seal against the wall of the said portion of the cylinder bore, the said ports being always disposed on opposite sides of the said peripheral packing;
   xi. means biassing the said tubular member towards a position in which the frontal packing is spaced from the respective seat, leaving open communication between the two ports when the piston is resting against the said stop, and
   xii. means adapted to displace the tubular member towards the said seat upon the movement of the piston towards the closed end of the cylinder.

2. Master cylinder assembly as claimed in claim 1, wherein the said tubular member has a diameter differing from that of the piston, the said biassing means for the tubular member comprising radial flanges formed on the tubular member and the piston respectively, the flange on the piston being disposed between the flange on the tubular member and the closed end of the cylinder, and the distance of the flange on the piston from the closed end of the cylinder when the piston is resting against the said stop being greater than the distance which separates the flange on the tubular member from the sealing surface of the frontal packing.

3. Master cylinder assembly as claimed in claim 2, wherein the bore of the cylinder has a first section of smaller diameter at the open end of the cylinder, a second section of greater diameter situated at the closed end of the cylinder, an annular shoulder separating the second section from the first section, the said annular shoulder facing the said closed end and forming the said stop for the piston, and wherein the said piston has a part extending into the second said section and formed with the said radial flange, the external diameter of said flange being greater than the diameter of the said first bore section, and the said tubular member being slidingly mounted in the said second bore section and having an inner diameter greater than the external diameter of the said radial piston flange, and wherein the radial flange of the tubular member extends inwardly to an internal diameter which is less than the external diameter of the piston flange, said flange on the tubular member being interposed between the said piston flange and the annular shoulder.

4. Master cylinder assembly as claimed in claim 3, wherein the said means adapted to displace the tubular member towards the said seat comprise a helical spring interposed between the said tubular member and the said annular shoulder.

5. Master cylinder assembly as claimed in claim 4, including a washer against which the end of the said helical spring which is remote from the annular shoulder bears, the said washer resting against the peripheral annular packing, and the said peripheral packing in turn resting against a radial shoulder formed in the external surface of the tubular member.

6. Master cylinder assembly as claimed in claim 5, wherein the said radial shoulder against which the peripheral annular packing rests is formed in a region of the tubular member of greater wall thickness than the end of the tubular member which faces the closed end of the cylinder, and including a seat for the frontal annular packing in the form of a terminal enlargement of the bore of the tubular member.

7. Master cylinder assembly as claimed in claim 1, wherein the radial seat cooperating with the frontal annular packing is formed upon the end of a threaded plug which closes the said other end of the cylinder.

8. Master cylinder assembly as claimed in claim 7, wherein the said plug is hollow, having a blind bore opening into the interior of the tubular member, the said blind bore having an internal diameter which is substantially equal to the internal diameter of the tubular member.

9. Master cylinder assembly as claimed in claim 8, wherein the bottom of the blind bore of the plug forms an abutment surface for one end of the reaction spring which urges the piston towards the open end of the cylinder.

10. Master cylinder assembly as claimed in claim 9, wherein the piston is formed in its end facing towards the closed end of the cylinder with a blind bore, and wherein the end of the reaction spring remote from the hollow plug rests against the bottom of the said blind bore formed in the piston.

11. Master cylinder assembly as claimed in claim 1, including at least one radial vent in the wall of the tubular member, the interior of the said tubular member communicating with the said port adapted to communicate with a point of use by way of said vent.

12. Master cylinder assembly as claimed in claim 1, wherein the piston has means defining, in correspondence with its part which is close to the open end of the bore of the cylinder, two peripheral grooves of rectangular cross section, a first sealing ring located with both axial and radial play, in one said groove, and a second sealing ring located with axial play in the other said groove; the first sealing ring having a substantially rectangular cross section with an outwardly curved profile on its surface facing the bore wall of the cylinder, and the second sealing ring having an H-shaped cross section with the end surfaces parallel to each other and perpendicular to the axis of the piston, and being disposed nearer the open end of the cylinder bore than the first sealing ring.

13. Master cylinder assembly as claimed in claim 1, including at least one sealing ring effecting sealing between the outer surface of the piston and the cylinder bore section in which the piston slides, the said sealing ring being of the annular cap type and being located in respective peripheral grooves of rectangular cross section formed in the external peripheral surface of the piston.

14. Master cylinder assembly as claimed in claim 1, said assembly being adapted for use in a hydraulic brake system having two separate hydraulic pressure utilizing circuits, the cylinder of the assembly housing first and second pistons in tandem, a first reaction spring acting on the first piston, a hollow plug closing the bore of the cylinder and supporting the first spring, the said first piston having at its opposite end an abutment, and a second reaction spring bearing against said abutment and acting upon the second piston, the second piston having means for engagement by a mechanical brake-operating member.

* * * * *

UNITED STATES PATENT OFFICE
CERTIFICATE OF CORRECTION

Patent No. 3,633,367            Dated      January 11, 1972

Inventor(s)    Philip S. Baldwin

It is certified that error appears in the above-identified patent and that said Letters Patent are hereby corrected as shown below:

Page 1    (IN THE HEADING)

Lines 4 and 5, delete "assignor to FIAT Societa per Azioni, Turin, Italy" and substitute therefor--assignor of an undivided one-half interest to FIAT Societa per Azioni, Turin, Italy--.

Signed and sealed this 8th day of August 1972.

(SEAL)
Attest:

EDWARD M. FLETCHER, JR.      ROBERT GOTTSCHALK
Attesting Officer             Commissioner of Patents